(12) United States Patent
Altenschmidt et al.

(10) Patent No.: US 7,059,310 B2
(45) Date of Patent: Jun. 13, 2006

(54) EXHAUST GAS RECIRCULATION

(75) Inventors: Frank Altenschmidt, Biberach (DE); Uwe Schaupp, Wernau (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 11/086,792

(22) Filed: Mar. 22, 2005

(65) Prior Publication Data
US 2005/0188967 A1 Sep. 1, 2005

Related U.S. Application Data

(63) Continuation-in-part of application No. PCT/EP03/10390, filed on Sep. 18, 2003.

(51) Int. Cl.
*F02M 25/07* (2006.01)
(52) U.S. Cl. .............................. 123/568.18; 123/568.24
(58) Field of Classification Search ........... 123/568.11, 123/568.17, 568.18, 568.23, 568.24
See application file for complete search history.

(56) References Cited

U.S. PATENT DOCUMENTS

| | | | | |
|---|---|---|---|---|
| 4,094,285 A | | 6/1978 | Oyama | 123/568.17 |
| 4,214,562 A | * | 7/1980 | Mowbray | 123/568.18 |
| 4,222,356 A | | 9/1980 | Ueda | 123/568.18 |
| 4,329,965 A | * | 5/1982 | Ueda et al. | 123/568.18 |
| 5,203,310 A | * | 4/1993 | Gatellier | 123/568.24 |
| 5,746,190 A | * | 5/1998 | Honda | 123/568.18 |
| 6,062,205 A | * | 5/2000 | Bevan et al. | 123/568.24 |
| 6,494,041 B1 | * | 12/2002 | Lebold | 123/568.18 |
| 6,907,868 B1 | * | 6/2005 | Veinotte | 123/568.18 |

FOREIGN PATENT DOCUMENTS

| | | |
|---|---|---|
| DE | 27 40 465 | 3/1979 |
| DE | 93 01 419 | 5/1993 |
| DE | 196 33 603 | 11/1997 |
| DE | 196 42 685 | 4/1998 |
| DE | 199 00 640 | 5/2000 |
| DE | 199 27 673 | 12/2000 |
| DE | 100 32 562 | 1/2002 |
| EP | 0 855 502 | 7/1998 |
| EP | 1 002 947 | 5/2000 |
| EP | 695 17 938 | 11/2000 |
| JP | 10 077 914 | 3/1998 |

* cited by examiner

Primary Examiner—Willis R. Wolfe, Jr.
(74) Attorney, Agent, or Firm—Klaus J. Bach

(57) ABSTRACT

In an internal combustion engine comprising a cylinder-head with at least one combustion chamber in the cylinder head and the cylinder head has at least one intake passage and one exhaust passage, and an external exhaust gas recirculation line which branches off from the exhaust passage and opens at least into one of the intake passages, a pivotable flap is arranged between the exhaust gas recirculation passage and the associated intake passage in the region where the exhaust gas recirculation line is connected to the intake passage, the flap opening or closing a connection between the intake passage and the exhaust gas recirculation passage as a function of the pivoting position adjustment of the flap.

11 Claims, 3 Drawing Sheets

EXHAUST GAS RECIRCULATION

This is a Continuation-In-Part Application of international application PCT/EP2003/010390 filed Sep. 18, 2003 and claiming the priority of German application 102 44 799.3 filed Sep. 26, 2002.

BACKGROUND OF THE INVENTION

The invention relates to an internal combustion engine comprising at least one combustion chamber in a cylinder head covering at least one cylinder, and having at least one intake passage and one exhaust passage extending through the cylinder head, and an exhaust gas recirculation passage which branches off the exhaust passage and opens at least into one intake passage.

For the design of modern internal combustion engines, increasingly ecologically based requirements are to be taken into account, for example a reduction in the emission of pollutants. The pollutant emissions can be markedly reduced through the use of high-grade catalytic converters. However, it is expedient to not only subsequently treat the exhaust gases leaving the internal combustion engine by means of a catalytic converter, but to also achieve better fuel consumption during actual engine operation by design measures. The quantity of the exhaust gas components which are problematical for the environment can already be considerably reduced before leaving the engine by virtually complete combustion of the fuel.

A known method of reducing the emissions is external exhaust gas recirculation.

With exhaust gas recirculation, in which at least some of the exhaust gases are directed back into the combustion chamber, virtually complete combustion of hydrocarbons, hitherto not completely burned, is achieved. Furthermore, a reduction in the nitrogen oxide emissions can thus be effected.

DE695 17 938 T2 discloses an arrangement for exhaust gas recirculation for an internal combustion engine. The internal combustion engine has at least one combustion chamber and also at least one intake passage and an exhaust passage. An exhaust gas recirculation passage opens out into at least one of the intake passages, a flap being arranged on its intake-passage-side part, this flap being arranged on the wall of the intake passage and being pivotable transversely to the intake passage. According to an embodiment variant, the flap, in its one end position, with an intake-passage-side surface thereof, it bears laterally against the intake passage in such a way as to be flush with adjacent wall parts of the intake passage, whereas, in its other end position, it forms a ramp-like and continuous constriction with the intake-passage-side surface in the intake passage. The exhaust gas recirculation passage is shut off in the one end position and is connected to the intake passage in the other end position. A flow of exhaust gases through the exhaust gas recirculation passage can be controlled by adjusting the flap, it being possible for a simple valve, for example in the form of a slide valve of the yes/no type, to be arranged on the inflow side for assisting the flap control, so a to ensure reliable shut-off of the exhaust gas recirculation.

EP 1 002 947 A1 discloses a first throttle flap for regulating the exhaust gas recirculation, this throttle flap being arranged just upstream of, or at the point at which, an exhaust gas recirculation passage opens into an intake passage. Arranged in the intake passage preferably orthogonally to the first throttle flap described above is a second throttle flap coupled to the first throttle flap. The common pivot axis of the two throttle flaps crosses both the exhaust gas recirculation passage and the intake passage. Due to the preferably orthogonal arrangement of the two flaps relative to one another, the air flow in the intake passage is throttled to the maximum extent when the first throttle flap is completely open.

JP 10077914 A discloses a slide valve for opening or closing an exhaust gas recirculation passage opening into an intake passage for an internal combustion engine. In this case, the slide valve is adjusted in a translatory manner transversely to the intake passage and thus is inserted into or drawn out of an exhaust gas recirculation passage extending transversely to the intake passage. In the inserted state, the slide valve does not form any disturbing contour projecting into the intake passage, but the slide rod required for actuating the slide valve does form such a disturbing contour.

DE 199 27 673 A1 discloses a changeover device for changing over an air feed of an internal combustion engine. In this case, each combustion chamber of the internal combustion engine has a controllable and a non-controllable air feed passage and also a controllable passage for an exhaust gas feed. The latter passage receives air via a branch of the non-controllable air feed passage of the adjacent combustion chamber. Furthermore, a rotary slide valve member with two slide valves arranged on a common rotary shaft is provided, this rotary slide valve member controlling the controllable passages of the respective combustion chamber in opposite directions.

EP 0 855 502 A2 discloses an internal combustion engine having an exhaust gas recirculation arrangement. Here, either a translatory movable slide valve or a rotary slide valve is arranged in a wall of the induction passage, of the exhaust gas recirculation passage just upstream of the orifice for metering the quantity of the recirculated exhaust gas relative to the rest of the combustion air.

DE 199 00 640 C1 discloses an exhaust gas recirculation system for a multi-cylinder internal combustion engine. In this case, the exhaust gas recirculation flow is set with shut-off flaps which are arranged in the individual induction lines and the operation of which is coupled via a drive shaft, so that they can be operated simultaneously. In this case, the shut-off valves are used both for quick stopping and for setting the recirculated exhaust gas flow. Arranged parallel to these induction lines are further induction lines which are provided for feeding air and not for feeding exhaust gases.

DE 196 33 603 C1 discloses an internal combustion engine having in each case at least two intake passages for each cylinder. These intake passages branch off from a common induction passage. An exhaust gas recirculation passage opens at least into one of the intake passages. The exhaust gas recirculation passage and the intake passage connected to it are designed in such a way that they can be shut off. To this end, a rotary slide valve having a rotatable shut-off cylinder is arranged in the region where the exhaust gas recirculation passage opens into the intake passage. Depending on the rotary position, the shut-off cylinder can keep the intake passage to the cylinder open, open up a connection of the exhaust gas recirculation passage via the rotary slide valve to the cylinder when the intake passage is shut off, or totally shut off the exhaust gas recirculation passage and the intake passage.

DE 100 32 562 A1 discloses an internal combustion engine having exhaust gas recirculation in which the exhaust gas recirculation lines branch off directly from the cylinders, in the region of a bottom dead center of the piston, and are controlled solely by the respective piston.

DE 27 40 465 A1 discloses an internal combustion engine having intake and exhaust lines arranged on the same side and having exhaust gas recirculation which can be actuated as a function of pressure. To this end, a connecting passage is arranged in the cylinder head of the internal combustion engine by a dividing wall which separates an exhaust passage and an intake passage. Inserted in the connecting passage is a spring-loaded valve which serves to regulate the exhaust gas quantity flowing into the combustion chamber. On account of the intake and exhaust passages arranged on the same side of the internal combustion engine, no additional lines are therefore required for the exhaust gas recirculation.

For exhaust gas recirculation on an internal combustion engine, it is known from DE 196 42 685 A1 to provide a manifold in a dividing plane between cylinder head and crankcase, this manifold being connected via branch passages in the cylinder head to the intake and exhaust passages of the internal combustion engine. Arranged between the exhaust- and intake-passage-side parts of the manifold is a valve which controls the exhaust gas flow from the exhaust side to the intake side. Due to the arrangement of the manifold in the dividing plane between the crankcase and the cylinder head, the hot exhaust gas in the manifold is cooled by the engine cooling system.

It is the object of the present invention an improved internal combustion engine of the type mentioned initially, including improved means for the metering of the exhaust gas recirculation and the stratification of the exhaust gases in the combustion chamber.

SUMMARY OF THE INVENTION

The invention is based on the general idea of providing exhaust gas recirculation in an internal combustion engine having a combustion chamber and at least one intake passage and an exhaust passage, this exhaust gas recirculation being controlled by a circle-segment-like/multisurface rotary slide valve which is arranged in a region where the exhaust gas recirculation passage opens into the intake passage. In this case, the rotary slide valve is arranged on the wall of the intake passage and is pivotable about an axis of rotation oriented transversely to the intake passage in such a way that, in its one end position, it bears with an intake-passage-side surface laterally against the intake passage in such a way as to be flush with adjacent wall parts of the intake passage and, in its other end position, forms with the intake-passage-side surface a ramp-like and continuous constriction, starting at the axis of rotation of the valve. In this case, the exhaust gas recirculation passage is shut off in the one end position by the rotary slide valve, whereas it is connected to the intake passage in the other end position. In addition, the circle-segment-like/multisurface rotary slide valve, in the one end position, is swung into a recess arranged on the intake passage and in the process, with a surface which is inclined relative to the intake-passage-side surface and is remote from the rotation axis, overlaps the exhaust gas recirculation line opening into the recess, or a passage connecting the recess to the intake passage, in such a way as to shut off the exhaust gas recirculation line or the passage.

It is especially advantageous in this case that the rotary slide valve is designed as a multisurface flap body and thus is of a robust and functionally reliable construction. Compared with the conventional virtually two-dimensional valve flaps, the three-dimensional design of the rotary slide valve has marked advantages in terms of rigidity and thus provides markedly improved control of the exhaust gas recirculation.

However, it is in particular essential to the invention that flow-conducting and flow-blocking surfaces which are functionally separate from one another are provided on the flap. In this case, a suitable flow-conducting surface is the intake-passage-side surface and a suitable flow-blocking surface is the surface which is inclined relative to the intake-passage-side surface and is remote from the rotation axis. In the known flaps, this functional separation is not provided for.

The invention therefore assigns different functions to different sides of the multisurface rotary slide valve.

According to a preferred embodiment of the invention, provision is made for the surface remote from the rotation axis to control the opening of the exhaust gas recirculation passage into the recess, and for a through-passage to be arranged in the flap, this through-passage connecting the recess to an exhaust gas outlet port on the intake-passage-side surface of the flap. In this way, the functionality of the flap or the rotary slide valve can be increased by the flap being assigned a control function with regard to the recirculated exhaust gas quantity on the one hand and by a flow passage being integrated in the flap on the other hand, so that an additional flow passage which connects the recess to the intake passage can be omitted.

According to an especially advantageous embodiment of the invention, the flap, in a position projecting into the intake passage, can close the flap-side end of the one passage section by means of its surface remote from the rotation axis. As a result, defined stratification of the exhaust-gas/air mixture in the intake passage and thus in the combustion chamber situated downstream can be controlled, whereby the combustion and thus the output of the internal combustion engine can be improved.

In another advantageous embodiment of the invention a baffle plate is arranged downstream of the flap in the direction of flow in the intake passage and subdivides the intake passage into at least two passage sections, so that the baffle plate produces exhaust gas stratification in the combustion chamber. When the flap is opened, the exhaust gas flows against the baffle plate, which, depending on the embodiment, subdivides the intake passage into two segments. On account of the baffle plate, optimum stratification for the combustion is achieved in the combustion chamber of the internal combustion engine. In this case, provision may be made for the exhaust gas recirculation to preferably be effected in an associated passage section. The optimum stratification of the fresh air and of the exhaust gases in the combustion chamber produces optimum combustion of the fuel/fresh-air/exhaust-gas mixture and thus assists smooth engine operation and at the same time reduced fuel consumption.

Further features and advantages of the invention will become apparent from the following description of the invention on the basis of the accompanying drawings.

DESCRIPTION OF PREFERRED EMBODIMENTS

Figure 1:
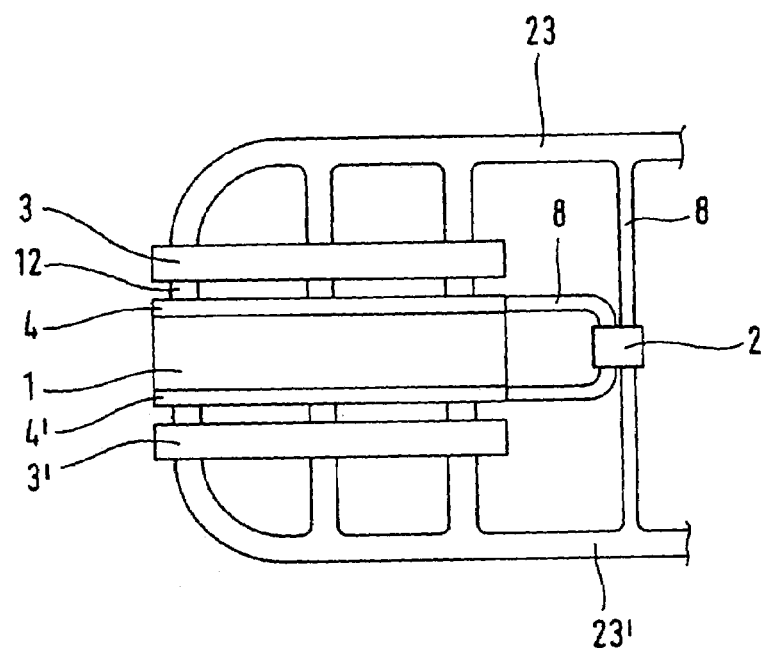
FIG. 1 schematically shows a plan view of a vehicle engine with exhaust gas recirculation according to the invention, FIG. 2 schematically shows a cross section of an intake passage with a flap according to the invention, FIG. 3 schematically shows a cross section as in FIG. 2 but with another flap, FIG. 4 schematically shows a cross section as in FIG. 3 but in a bifurcated passage, FIG. 5 schematically shows a cross section as in FIG. 3 but in a twin passage, and FIG. 6 schematically shows a plan view as in FIG. 1 but with different exhaust gas recirculation.

According to FIG. 1, a schematically shown vehicle engine 1 has a plurality of cylinders (not shown in FIG. 1), a cylinder head 3 being arranged on that end of the cylinders which is remote from the crankshaft. An exhaust passage (not shown) and an intake passage 12 (cf. FIG. 2) are integrated in the cylinder head 3. Branching off from an exhaust 23 is an exhaust gas recirculation line 8 which is connected to an exhaust gas recirculation rail 4 via an exhaust gas recirculation valve 2. As a result, some of the exhaust gases pass via the exhaust gas recirculation rail 4 and the exhaust gas recirculation line 8 into the intake passage 12 and are thus fed again to a combustion chamber 15 (cf. FIG. 4 and FIG. 5) for repeated combustion.

The solution according to the invention is shown in accordance with FIG. 1 for vehicle engines 1 with a V-shaped cylinder arrangement; however, it is also conceivable for an in-line engine.

Figure 2:
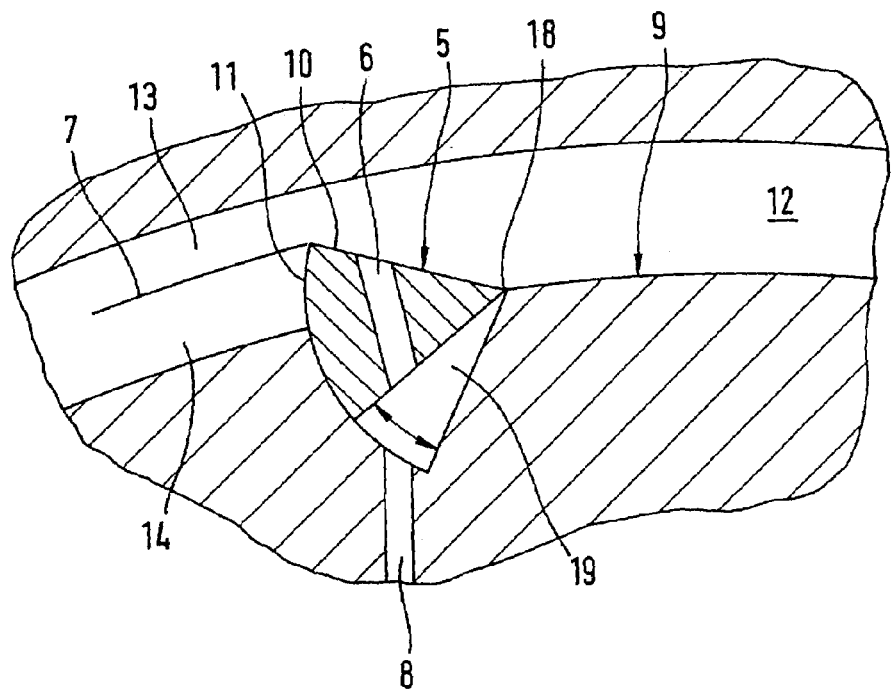

According to FIG. 2, a flap 5 which is pivotable about a rotation axis 18 extending perpendicularly to the image plane is arranged in the intake passage 12 leading to the cylinder head 3 and can be swung completely into a recess 19 incorporated in the inner wall 9 of the intake passage 12. The flap 5 has a first surface 10 and a second surface 11 inclined relative to the first surface 10. When the valve flap 5 is closed, that is the valve flap 5 is retracted into the recess 19, the first surface 10 is flush with adjacent wall parts of the intake passage 12, thereby producing a continuous, smooth inner wall 9 of the intake passage. In the open position, the flap 5 projects into the intake passage 12. In the exemplary embodiment according to FIG. 2, a through-bore 6 extends through the first surface 10 and the flap 5.

Furthermore, a baffle plate 7 situated downstream of the flap 5 in the direction of flow is integrated in the intake passage 12 and subdivides the intake passage 12 into a first passage section 13 and a second passage section 14. In this case, depending on the embodiment, the baffle plate 7 can be designed in such a way that it subdivides the intake passage 12 into two semicircular passage sections 13, 14 or else it subdivides the intake passage 12 in a segment-like manner into two passage sections 13, 14 of different cross section.

The baffle plate 7 serves to improve the stratification of the fresh air flowing in through the intake passage 12 and of the exhaust gases in the combustion chamber 15, which are passed through the exhaust gas recirculation passage 8 and the through-passage 6, thereby achieving an increase in the maximum exhaust gas recirculation rate and an associated reduction in the fuel costs and in the nitrogen oxide emissions.

The flap 5 can be adjusted between an open position and a closed position, in which it opens or closes an exhaust gas recirculation passage 8.

In the open position, the flap 5 projects into the intake passage 12 and, with the second surface 11, according to FIG. 2, closes the second passage section 14. In this case, the baffle plate 7 and the first surface 10 of the flap 5 form a continuous surface bent along a common contact edge. In this position, the exhaust gas can flow through the exhaust gas recirculation passage 8 and through the through-passage 6 integrated in the flap 5 into the passage section 13, whereas, when the flap 5 is retracted, fresh air flows without hindrance through the two passage sections 13, 14, and no exhaust gas passes via the exhaust gas recirculation passage 8 and through the through-passage 6 into the intake passage 12. In principle, however, a design without a baffle plate 7 is also conceivable.

Figure 3:
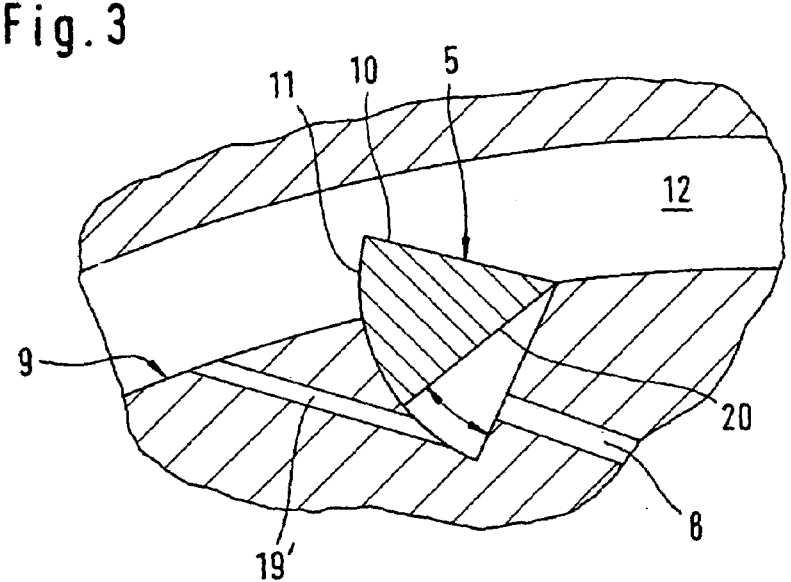

A further embodiment of the flap 5 is shown according to FIG. 3. Here, the mounting and arrangement of the flap 5 on the inner wall 9 of the intake passage is in accordance with FIG. 2, the flap 5 being designed as a multisurface flap body. In contrast to FIG. 2, the recirculated exhaust gases enter the intake passage 12 through a passage 19 integrated into the inner wall 9 of the intake passage. When the flap 5 is closed, the passage 19' is closed by the second surface 11 of the flap 5, whereas the exhaust gas recirculation passage 8 is closed by a third surface 20 of the flap 5.

In a similar manner as in FIG. 3, the first surface 10 bears against the adjacent wall parts of the inner wall 9 of the intake passage in a flush manner when the flap 5 is closed.

When the flap 5 is opened, the first surface 10 serves as a baffle surface, so that, in this embodiment, exhaust gas stratification in the combustion chamber 15 is achieved without baffle plates 7 additionally arranged downstream of the flap 5 in the direction of flow and dividing the intake passage 12. In principle, however, the use of additional baffle plates 7 is also conceivable.

Figure 4:
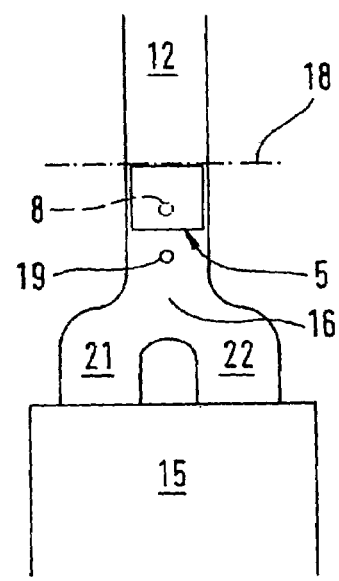

A design of the intake passage 12 as a bifurcated passage 16 is shown in FIG. 4, this bifurcated passage 16 separating the intake passage 12 just upstream of an intake valve. The flap 5 is arranged in the direction of flow upstream of the points at which the passage branches into a left-hand passage 21 and a right-hand passage 22. The design of the flap 5 as a multisurface flap body according to FIG. 3 or as a flap 5 provided with the through-passage 6 according to FIG. 2 remains unaffected.

Furthermore, an arrangement of two flaps 5, i.e. with a respective flap 5 in each of the passage sections 21, 22 of the bifurcated passage 16, in the direction of flow downstream of the branching point is also conceivable.

Figure 5:
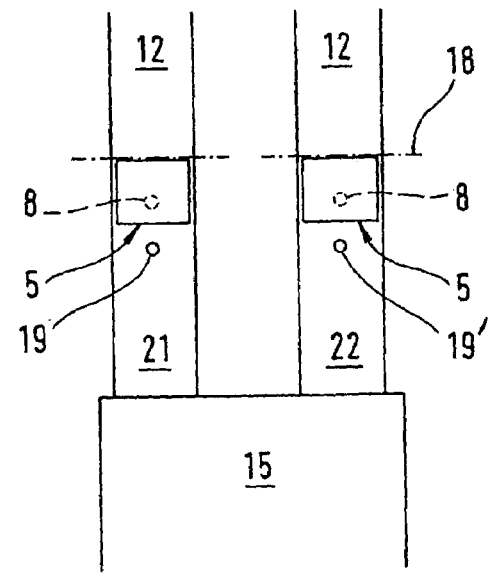

A design of the intake passage 12 as a twin passage is shown in FIG. 5. Here, the arrangement of a respective flap 5 is provided in each case in the left-hand passage section 21 and the right-hand passage section 22. However, it is also conceivable to merely arrange a flap 5 in only one of the passage sections 21 or 22. In accordance with FIG. 4, it is also possible in FIG. 5 to design the flap 5 as a multisurface flap body or as a flap 5 provided with a through-bone 6.

With one flap 5 each in the respective left-hand passage section 21 and the right-hand passage section 22, exhaust gas stratification that can be adjusted in an even more accurate manner is achieved in the combustion chamber 15. In this case, provision is made for designing the flaps 5 to be operable simultaneously or separately.

During operation of the vehicle engine 1, fresh air is drawn into the combustion chamber 15 during the induction phase through the intake passage 12 via the cylinder head 3. To reduce the nitrogen oxide emission and the fuel consumption, a certain quantity of exhaust gas is admixed with the drawn-in fresh air via an exhaust gas recirculation passage 8 or 19. The proportion of admixed exhaust gas is controlled via the flap 5, which is pivotably mounted on a pivot axis 18 extending in the image plane.

When the flap 5 is opened, exhaust gas discharges from the exhaust gas recirculation passage 8, or the passage 19, into the intake passage 12. On the one hand, the flap 5 may be designed in such a way that a through-bore 6 is integrated in it, one end of said through-bore 6 adjoining an exhaust gas recirculation passage 8 and the other end of said through-bore 6 adjoining the intake passage 12; on the other hand, however, it is also conceivable to design the flap as a multisurface flap body.

When the flap 5 is opened, it projects into the intake passage 12 and brings about predetermined stratification of the combustion gases in the combustion chamber 15 by means of its first surface 10 and/or by means of the baffle plate 7 integrated in the intake passage 12. In the closed state, the flap 5 closes the exhaust gas recirculation passage 8 and its first surface 10 terminates flush with the inner wall 9 of the intake passage.

Figure 6:
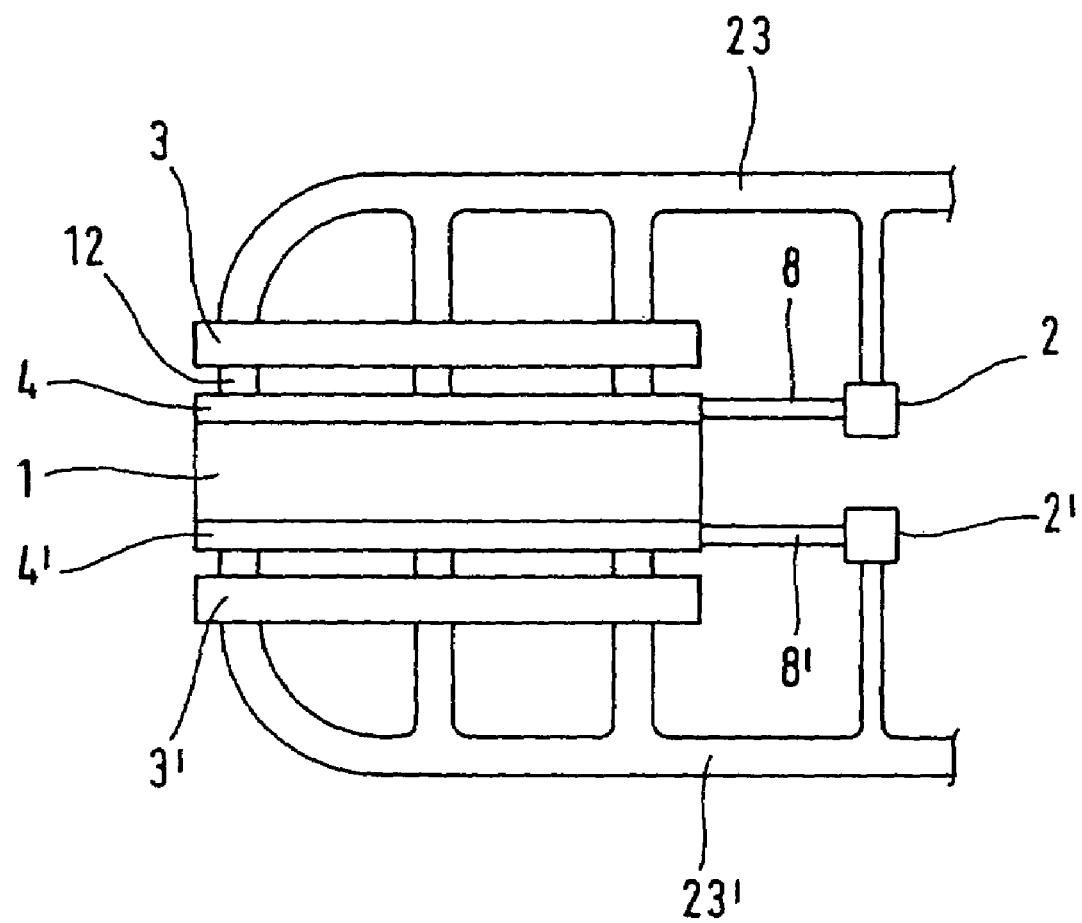

An embodiment with two exhaust gas recirculation valves 2 is shown according to FIG. 6. Starting from the exhaust manifold 23 or 23', the exhaust gas is directed via the respective exhaust gas recirculation passage 8 or 8' to the respective exhaust gas recirculation valve 2, 2' and is delivered from there in a metered manner to the exhaust gas recirculation passage 4 or 4', respectively. As a result, separate control of the recirculated exhaust gas quantity for two cylinder banks (not designated in any more detail in FIG. 6) is possible.

What is claimed is:

1. An internal combustion engine, comprising a cylinder-head with
    at least one combustion chamber (15), at least one intake passage (12) and at least one exhaust passage (23) for gas exchange in the combustion chamber,
    an exhaust gas recirculation passage (8) extending from the exhaust passage (23) to at least one of the intake passages (12), and
    a valve flap (5), which is arranged on an intake-passage-side part of the exhaust gas recirculation passage (8), and has a pivot axis (18), disposed at a wall of the intake passage (12) and oriented transversely to the intake passage (12), and, in one end position thereof, bears with an intake-passage-side surface (10), laterally against the intake passage (12) in such a way as to be flush with adjacent wall parts of the intake passage (12) and, in its other end position, forms with the intake-passage-side surface (10), a ramp-like, continuous constriction, adjoining the pivot axis (18), in the intake passage (12), the exhaust gas recirculation passage (8) being shut off in the one end position of the flap (5) and being in communication with the intake passage in the other end position,
the flap (5), in an axial view of the pivot axis (18), being in the form of a circle-segment-like/multisurface rotary slide valve which in one end position is pivoted into a recess (19) arranged on the intake passage (12) and, with a surface (11) which is inclined relative to the intake-passage-side surface (10) and is remote from the pivot axis, overlaps the exhaust gas recirculation passage (8) opening into the recess (19), or a passage (19') connecting the recess (19) to the intake passage (12), in such a way as to shut off said passage (8) or said passage (19').

2. The internal combustion engine as claimed in claim 1, wherein the surface (11) remote from the pivot axis controls the opening of the exhaust gas recirculation passage (8) into the recess (19), and in that a through-bore (6) is arranged in the flap (5), this through-bore (6) connecting the recess (19) to an exhaust gas outlet port on the intake-passage-side surface (10) of the flap (5).

3. The internal combustion engine as claimed in claim 1, wherein the passage (19') connecting the recess (19) to the intake passage (12) opens into the intake passage (12) downstream of the flap (5) in the direction of flow and at a distance from the flap (5).

4. The internal combustion engine as claimed in claim 1, wherein two intake passages extend to each cylinder, and the intake passage (12) is designed as a bifurcated passage (16) having two associated fork sections (21, 22), the flap (5) being arranged upstream of the forking in the direction of flow.

5. The internal combustion engine as claimed in claim 1, wherein a baffle plate (7) arranged downstream of the flap (5) in the direction of flow is provided in the intake passage (12) so as to subdivide the intake passage (12) into at least two passage sections (13, 14).

6. The internal combustion engine as claimed in claim 5, wherein the flap (5), in a position in which it projects into the intake passage (12), extends across the flap-side end of one passage section (14) such that a surface (11) thereof remote from the rotation axis blocks the passage section (14).

7. The internal combustion engine as claimed in claim 5, wherein the exhaust gas recirculation is effected in an associated passage section (13).

8. The internal combustion engine as claimed in claim 1, wherein two intake passages extend to each cylinder, and the intake passage (12) is a twin passage having two separate passages (21, 22).

9. The internal combustion engine as claimed in claim 8, wherein a flap (5) is arranged in only one passage (21) of the twin passage.

10. The internal combustion engine as claimed in claim 8, wherein a flap (5) is arranged in each of the passages (21, 22) of the twin passage.

11. The internal combustion engine as claimed in claim 9, wherein the flaps (5) controllable simultaneously or separately.

* * * * *